(12) United States Patent
Minkin

(10) Patent No.: US 9,575,642 B1
(45) Date of Patent: Feb. 21, 2017

(54) SYSTEM AND METHOD FOR MANAGING DIGITAL MEDIA PLAYBACK

(71) Applicant: Wiltech, Inc., Wilmette, IL (US)

(72) Inventor: Vladimir Minkin, Wilmette, IL (US)

(73) Assignee: Wiltech, Inc., Wilmette, IL (US)

( * ) Notice: Subject to any disclaimer, the term of this patent is extended or adjusted under 35 U.S.C. 154(b) by 292 days.

(21) Appl. No.: 14/166,634

(22) Filed: Jan. 28, 2014

(51) Int. Cl.
*G06F 3/048* (2013.01)
*G06F 3/0484* (2013.01)

(52) U.S. Cl.
CPC .................... *G06F 3/04847* (2013.01)

(58) Field of Classification Search
CPC ........................................ G06F 3/048
See application file for complete search history.

(56) References Cited

U.S. PATENT DOCUMENTS

| | | | |
|---|---|---|---|
| 6,262,724 B1* | 7/2001 | Crow et al. | 715/723 |
| 2002/0063737 A1* | 5/2002 | Feig | G06F 3/04847 715/786 |
| 2013/0322848 A1* | 12/2013 | Li | H04N 5/783 386/241 |

* cited by examiner

*Primary Examiner* — Peiyong Weng
(74) *Attorney, Agent, or Firm* — Law Offices of Konrad Sherinian

(57) ABSTRACT

A media playback system provides accurate navigation of playback of a digital media. The system includes a media player operating on a media playback device. The media is played back by the media player. The system provides a set of navigator controls with increasing granularities. The set of controls includes a set of navigation regulators. The navigation regulators support finer navigation of the playback of the digital media. Each control in the set is adapted to move the current playback position of the media to a position corresponding to an interactive visual time mark when the interactive visual time mark is operated on.

19 Claims, 15 Drawing Sheets

SYSTEM AND METHOD FOR MANAGING DIGITAL MEDIA PLAYBACK

CROSS REFERENCE TO RELATED APPLICATIONS

None

FIELD OF THE DISCLOSURE

The present invention relates to digital media players, and more particularly relates to a system and method for managing digital media playback. More particularly still, the present disclosure relates to a system and method for accurate navigation of a digital media.

DESCRIPTION OF BACKGROUND

Media, such as audio and video, is often created, stored and distributed in digital formats. Some well-known digital media formats are MPEG-1 or MPEG-2 Audio Layer III ("MP3"), MPEG-4 Audio, Windows Media Audio ("WMA"), Audio Video Standard ("AVS"), Windows Media Video ("WMV"), RealVideo, etc. A digital media (such as a song, an audio book or a video clip) is generated by a codec that encodes a data stream or signal for transmission, storage or encryption. The codec is an electronic device or computer program that encodes and/or decodes a digital data stream or signal. For example, a digital audio work (such as a song) can be created in Waveform Audio ("WAV") format. WAV audio data is raw and uncompressed audio data. A MP3 codec is then used to convert the WAV audio data into the MP3 format.

One common way to store the digital audio work in MP3 format is to save it as a MP3 file. The MP3 codec greatly reduces the size of the digital audio work. In other words, the MP3 file of the digital audio work is significantly smaller than the corresponding WAV file. For example, when the MP3 format is at 128 kps (kilobits per second), the MP3 file size is about ten percent of the corresponding WAV file size. When the digital media (such as a MP3 file) is to be played back, it is decoded by a codec into digital data streams or signals. A codec is thus an encoder and a decoder. As used herein, a work (such as a sound track, music video clip, a video clip, etc.), the digital data representing the work (such as encoded data in MP3 format or decoded data) and the medium (such as a MP3 file or streaming of the digital data) for storing or transmitting the work are collectively and separately referred to herein as a digital media (or media for short).

Desktop computers, laptop computers, tablet computers and mobile smartphones generally are shipped with digital media players (or media player for short) that support well-known digital media formats. In other words, the preinstalled media players are capable of playing back digital media works (such as a local file, downloaded media file from a networked source or streaming media over the Internet) that are encoded in well-known digital media formats. For example, smartphones often provides a music player for playing digital audio (such as MP3 files or WMA streaming audio over the Internet). These smartphones also provide a video player for playing digital video works (such as YouTube videos, MP4 video files or WMV video files). As an additional example, Windows desktop or laptop computers often include the popular Windows Media Player for playing both audio and video media. Various media players are also available for download over the Internet.

Media player usually provide a number of controls for users to manage and navigate playback of digital media. For example, a media player includes a play-pause toggle button for switching between play and pause, a next button for skipping to the next media in the current play list, a next button for going back to the beginning of the currently being played media (i.e., the current media), and a fast forward button for fast forwarding the current playback. The fast forwarding can be configured to skip, for example, ten seconds (also referred to herein as fast forward speed) of the current media for every one tenth of second the fast forward button is continuously pressed and held down. The current media is the media that is currently being played back by the media player. When the fast forward button is pressed and held down for a longer time, the fast forward speed can be designed to accelerate.

Media players may also provide a playback progress control in the form of a progress bar with a sliding control (such as a button or bar). The progress control shows the current playback position within the current media. The current playback position (or current position for short) thus indicates the playback progress. The sliding control allows a user to navigate to a desired position within the media by dragging (using a mouse or touchscreen) the sliding control to the desired position. The desired position can be after or before the current playback position. However, when the media is long (such as a ten-hour-long audio book recording, podcasts, video clips, movies, etc.), a slight adjustment of the position of the sliding control or a quick press of the fast forward button usually causes the media players to jump for a significant amount of time (such as ten or twenty minutes). In other words, a significant amount of the content of the current media is skipped over by the media players. Media players on smartphones usually provide fast forward and remind buttons that adjust media playback by a predefined amount of seconds (such as ten to thirty seconds). Accordingly, it is very difficult for users to accurately navigate the playback to a specific position within the current media. This problem is exacerbated on smartphones due to their smaller physical screens and progress controls. For example, a finger touch on a fast forward button on a smartphone can easily jump for over an hour of an audiobook.

Accordingly, there is a need for a system and method that accurately navigate media playback to a specific position within a media.

OBJECTS OF THE DISCLOSED SYSTEM, METHOD, AND APPARATUS

Accordingly, it is an object of this disclosure to provide a media playback system and method.

Another object of this disclosure is to provide a media playback system and method providing accurate navigation of a digital media.

Another object of this disclosure is to provide a media playback system and method providing accurate navigation of a digital media with a hierarchy of navigation regulators.

Another object of this disclosure is to provide a media playback system and method providing accurate navigation of a digital media with a hierarchy of navigation regulators of different granularities.

Another object of this disclosure is to provide a media playback system and method providing accurate navigation of a digital media with a hierarchy of linear navigation regulators of different granularities.

Another object of this disclosure is to provide a media playback system and method providing accurate navigation of a digital media with a hierarchy of nonlinear navigation regulators.

Another object of this disclosure is to provide a media playback system and method providing visual indicators of time marks within a digital media.

Another object of this disclosure is to provide a media playback system and method providing interactive visual indicators of time marks within a digital media.

Another object of this disclosure is to provide a media playback system and method for moving the current playback position of a media to an interactive visual time mark within the media.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a method and system for accurate navigation of the playback of a media. In accordance with the present teachings, the media playback system includes a media player operating on a media playback device, and a media played back by the media player. The media playback system further includes a set of navigation controls with increasing granularities. The set of navigation controls includes a set of navigation regulators. Each navigation regulator in the set of navigation regulators includes a navigation progress indicator that is adapted to adjust the current playback position of the media. Each navigation progress indicator operates within a corresponding active zone and resets to a corresponding reference point after the current playback position is adjusted.

Further in accordance with the present teachings is a method for accurately navigating the playback of a media. The method operates within a media playback device and includes reading a media from a media source, and playing back the media using one or more media output devices. The method also includes receiving a user input to adjust a current playback position of the media. The user input is generated using a navigation progress indicator of a first navigation regulator. The navigation progress indicator is operative within an active zone of the first navigation regulator. Furthermore, the method includes converting the user input into a time adjustment, and adjusting the current playback position of the media based on the time adjustment, thereby forming a new current playback position. In addition, the method includes resetting the navigation progress indicator to a reference point of the active zone of the first navigation regulator.

Further in accordance with the present teachings is a media playback system for accurately navigating the playback of a digital media. The media playback system includes a media playback device, a media player operating on said media playback device, and a media played back by said media player. The media playback system further includes a set of navigation controls with increasing granularities. Each navigation control in said set of navigation controls has an active zone. Said set of navigation controls is displayed by said media player on a screen of said media playback device and includes a set of navigation regulators. Each navigation regulator in said set of navigation regulators includes a navigation progress indicator that is adapted to adjust a current playback position of said media. Each navigation progress indicator operates within the corresponding active zone and resets to a corresponding reference point after said current playback position is adjusted. The media playback system also includes a set of visual time marks associated with said set of navigation controls. Said set of visual time marks corresponds to a set of time marks within said media and is displayed by said media player on said screen.

Further in accordance with the present teachings is a media playback system for accurately navigating the playback of a digital media. The media playback system includes a media playback device, a media player operating on said media playback device, and a media played back by said media player. The media playback system further includes a set of navigation controls with increasing granularities. Said set of navigation controls is displayed by said media player on a screen of said media playback device. In addition, the media playback system includes a set of interactive visual time marks associated with said set of navigation controls. Said set of interactive visual time marks corresponds to a set of time marks within said media and is displayed by said media player on said screen. Each interactive visual time mark in said set of interactive visual time marks is adapted to adjust a current playback position of said media to a corresponding time mark.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
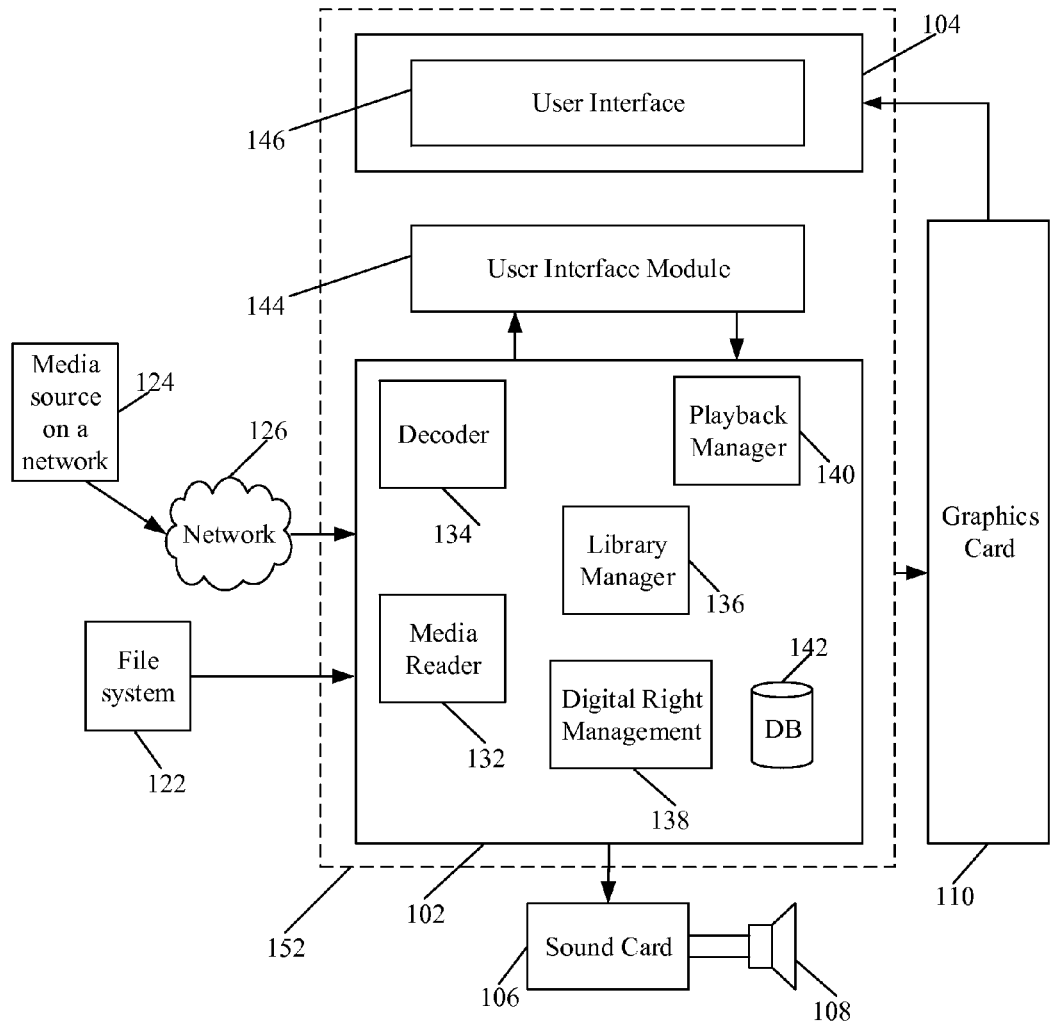
FIG. 1 is simplified block diagram of a media playback system in accordance with this disclosure.
Figure 15:
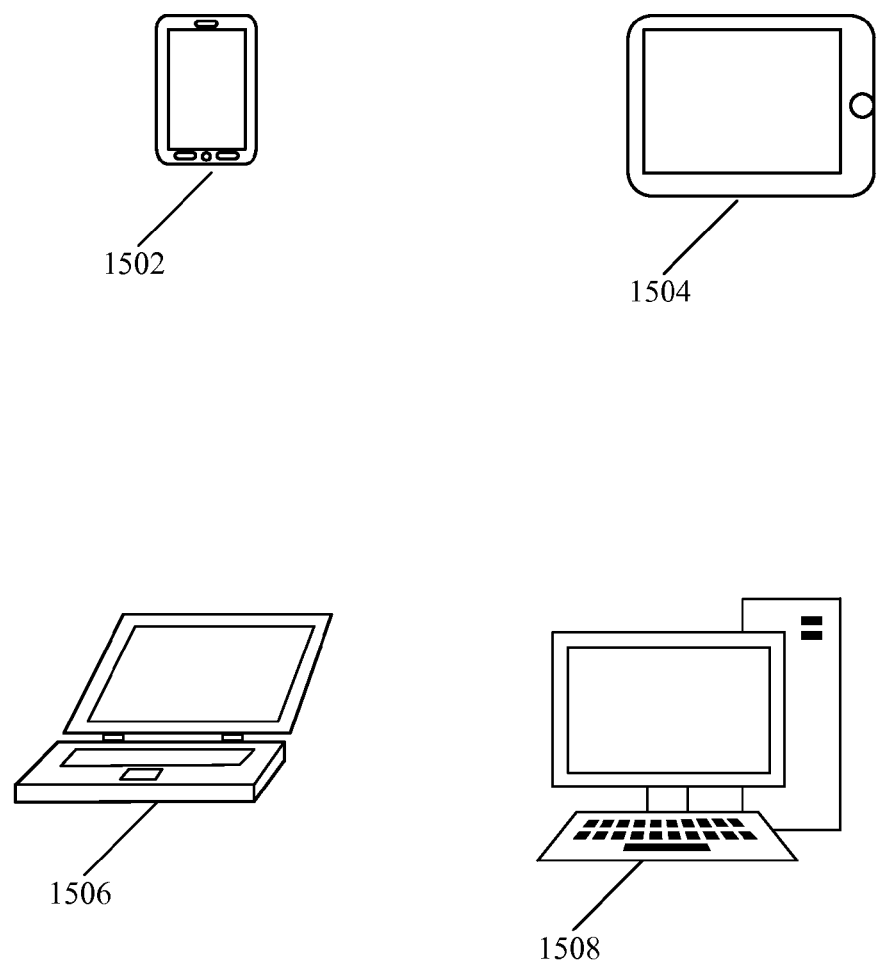
FIG. 15 is a perspective view of media playback devices in accordance with the teachings of this disclosure.

Turning to the Figures and to FIG. 1 in particular, a media playback system 100 is illustrated. The illustrative media playback system 100 includes a media player 152 that plays back audio, video and other types of media. In one implementation, the media player 152 is computer software program running on a smartphone, a tablet computer, a laptop computer, or a desktop computer (each of which is referred to herein as a media playback device). The media playback device can be any of the devices pictured in FIG. 15. In addition to a processor, a memory and a display screen 104, the media playback device also includes a sound card 106 and a graphics card 110. The media playback device also includes a speaker 108 that is operatively coupled to the sound card 106. Alternatively, the media playback device does not include the speaker 108, but provides a plug for connecting the sound card 106 to an ear phone (not shown). As used herein, the display 104, the sound card 106, the speaker 108 and the graphics card 110 are termed as media output devices.

The media player 152 includes a media player engine 102 and a user interface module 144 that manages a user interface 146 of the media player 152. The media player engine 102 includes a plurality of components, such as a media reader 132 reading media data from a media source, a decoder 134 that decodes the media data read by the media reader 132, a media library manager 136, a digital right management component 138 that manages license rights of a digital media, a playback manager 140, a media library database 142 for storing media information (such as media metadata and playlists), etc. The library manager 134 provides various media management functions, such as creation, editing and deletion of playlists; organization of media content by artist, album and genre; and import of a set (meaning one or more) of medias (such as audio and video files) into the media library database 142.

When the media player 152 plays back a media, the media reader 132 reads media data from a media source of the media. The media source can be a local file 122 stored in a storage device of the media playback device. In one implementation, the local file 122 is a set of files forming a media, such as an audio book. Alternatively, the media source is a media source on a network 124 that is accessible over a network 126, such as the Internet or a private local area network. The media source 124 can be, for example, a streaming content source, a media file on the network, or a media server serving medias. Depending on the digital media format in which the media is encoded, a corresponding decoder 134 is selected to decode the media. Audio data of the decoded media is sent to the sound card 106 which then generates sound signals and transmits the sound signals to the speaker 108.

Similarly, video data of the decoded media is sent to the graphics card 110 which then generates image signals and transmits the image signals to the display screen 104. The screen 104 further displays the user interface 146 of the media player 152. For example, the user interface 146 includes a content area for displaying the video content of the media, and other areas providing control over the media player 152 by a user. The control areas provides, for example, a progress control, a play-pause toggle button, a fast forward button, a next button, a previous button, etc. The control areas may also include various menu items for a user to, for example, create playlists, edit playlists and import a set of medias into the media library database 142. When a user interacts with the user interface 146, the user interface module 144 receives the corresponding user interface events, such as a click on a button or menu item, from the underlying operating system or user interface system running on the media playback device. The user interface module 144 then converts the user interface events into commands and transmits the commands to the media player engine 102.

For example, when the user fast forwards the playback of the media by dragging the sliding control of the progress control to a position beyond the current playback position, the media player engine 102 receives a command to fast forward the playback to the new position, which then becomes the current playback position. The commands are handled by the playback manager 140. The playback manager 140 further handles commands that are automatically generated. For example, when a song within a playlist is finished, the media player engine 152 automatically generates a command to play the next song in the playlist.

Figure 2:
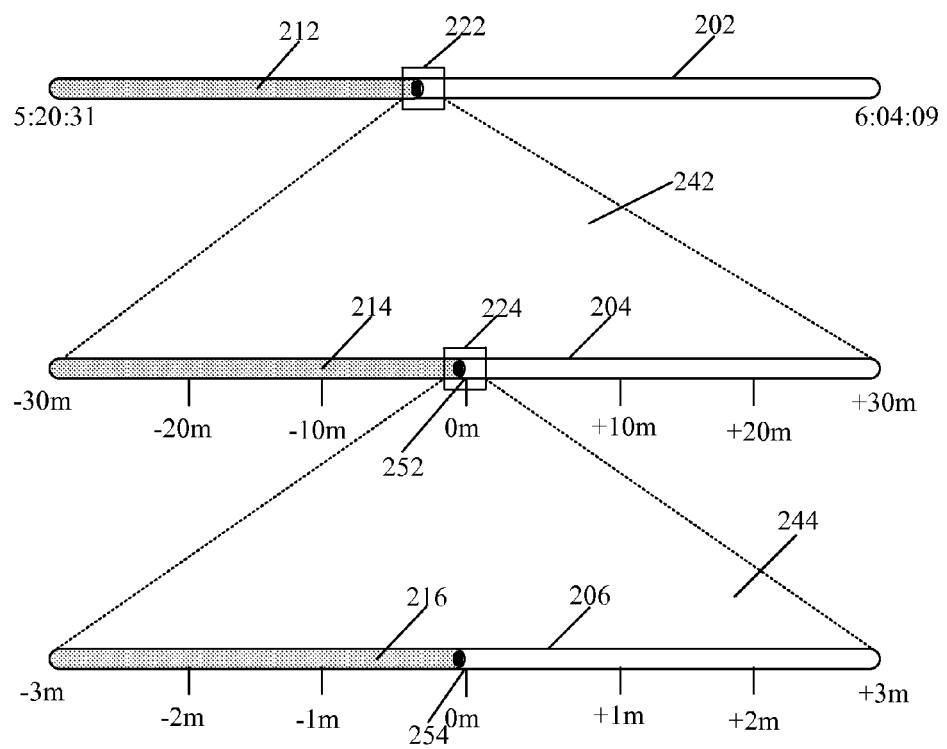
FIG. 2 is a block diagram depicting a media playback navigation system in accordance with the teachings of this disclosure.

Referring now to FIG. 2, a media playback navigation system 200 is illustrated. The playback navigation system 200 includes an optional media playback progress control 202 and a set (meaning one or more) of navigation regulators. In one implementation in accordance with the present teachings, the playback navigation system 200 includes the media playback progress control. In a different implementation, the playback navigation system 200 does not include the media playback progress control 202. In a further different implementation, the playback navigation system 200 includes more than one media playback progress control s. The optional progress control 202 and the set of navigation regulators are collectively referred to herein as media playback navigation controls (or navigation controls for short).

The set of navigation regulators forms a hierarchy of navigation regulators. In one implementation, the set of navigation regulators includes a single navigation regulator. Alternatively, the set of navigation regulators includes two or more navigation regulators. The illustrative navigation system 200 includes two navigation regulators 204,206. The navigation regulator 204 is a higher level navigation regulator than the navigation regulator 206. A person of ordinary skills in the art will appreciate that navigation controls 202, 204, and 206 can adapted to operate in a right-to-left manner for people who read from right to left.

The progress control 202 is a graphical display indicating the playback progress of a media (such as a song or a video clip). In one implementation, the progress control 202 is interactive and allows a user to adjust the current playback position. In other words, the progress control 202 allows the user to fast forward or rewind the playback of the current media. For example, the user uses a mouse, stylus or finger to drag the left end (such as a sliding control) of the progress control 202 to the left or right from the current playback position. In such a case, the current playback position is referred to herein as a reference point of the progress control 202.

The progress indicator 212 can be represented in different styles, such as a filled portion of the progress control 202. For example, when the progress control 202 is two hundred pixels in length, and twenty five percent of the media has been played, the progress indicator 212 is fifty pixels in length. As an additional example, when the progress control 202 is two hundred pixels in length, and seventy percent of the media has been played, the progress indicator 212 is then one hundred forty pixels in length. When the current media is being played, the progress indicator 212 continuously moves and extends towards the left end of the progress control 202.

While the progress control 202 and the progress indicator 212 are measured in pixels, the media length is measured in time. For example, a sound track is four minutes and twenty seven seconds long (i.e., 4:27, 04:27, 0:4:27, or 0:04:27), and a video clip (such as a movie) is two hours thirty minutes and forty three seconds long (i.e., 2:30:43 or 02:30:43). As used herein, minute is also referred to as m or min; and second is also referred to as s. Regarding the illustrative implementation, the current media is 11:24:40 (meaning eleven hours, twenty four minutes and forty seconds) long; and the beginning 5:20:31 of the current media has already been played back. The present teachings are applicable to a media of different length. The right end and left end of the progress control 202 correspond to the end and beginning of the media respectively. Alternatively, the right end and left end of the progress control 202 correspond to the beginning and end of the media respectively. The process to map the playback progress of the media to the progress control 202 and the progress indicator 212 is further illustrated by reference to FIG. 3.

Figure 3:
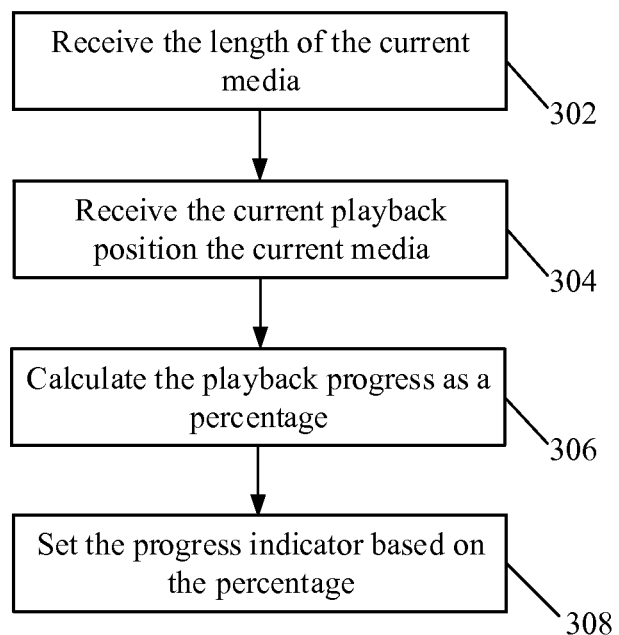
FIG. 3 is a flowchart depicting a process by which the playback progress of a media is displayed in accordance with the teachings of this disclosure.

Turning now to FIG. 3, a process 300 performed by the user interface module 144 to indicate the playback progress of the media on the display 104 is shown. In one implementation, the playback manager 140 of the media player engine 102 provides the length (e.g., in seconds or milliseconds) of the media to the user interface module 144. In a further implementation, the media player engine 102 periodically provides the user interface module 144 with the current playback position within the media. For example, every twenty milliseconds, the media player engine 102 updates the user interface module 144 with the current playback position, such as twenty minutes, thirty seconds, and three hundred eighty milliseconds (i.e., 0:20:30:380) from the beginning of the media. Accordingly, at 302 and 304, the user interface module 144 receives the length and current playback position of the current media respectively.

At 306, the user interface module 144 calculates the playback progress as a percentage. For example, the playback progress is 0.4 when the length of the current media is two hundred forty minutes and the current playback position is ninety six minutes from the beginning of the current media. At 308, the user interface module 144 sets the progress indicator 212 based on the percentage. In the example above, the progress indicator 212 is set to be eighty pixels in length if the full length of the progress control 202 is two hundred pixels in length.

Turning back to FIG. 2, the progress indicator 212 is oftentimes an interactive control. In other words, a user can use a pointing device (such as a mouse or stylus) or a finger to drag the left end (such as a sliding control) of the progress indicator 212 to a different position on the right or left of the current position. When the mouse, stylus or finger is released, the current media will then be played back from the new position. The process, triggered by the release of the mouse or stylus, for controlling and navigating the playback of the current media is further illustrated by reference to FIG. 4.

Figure 4:
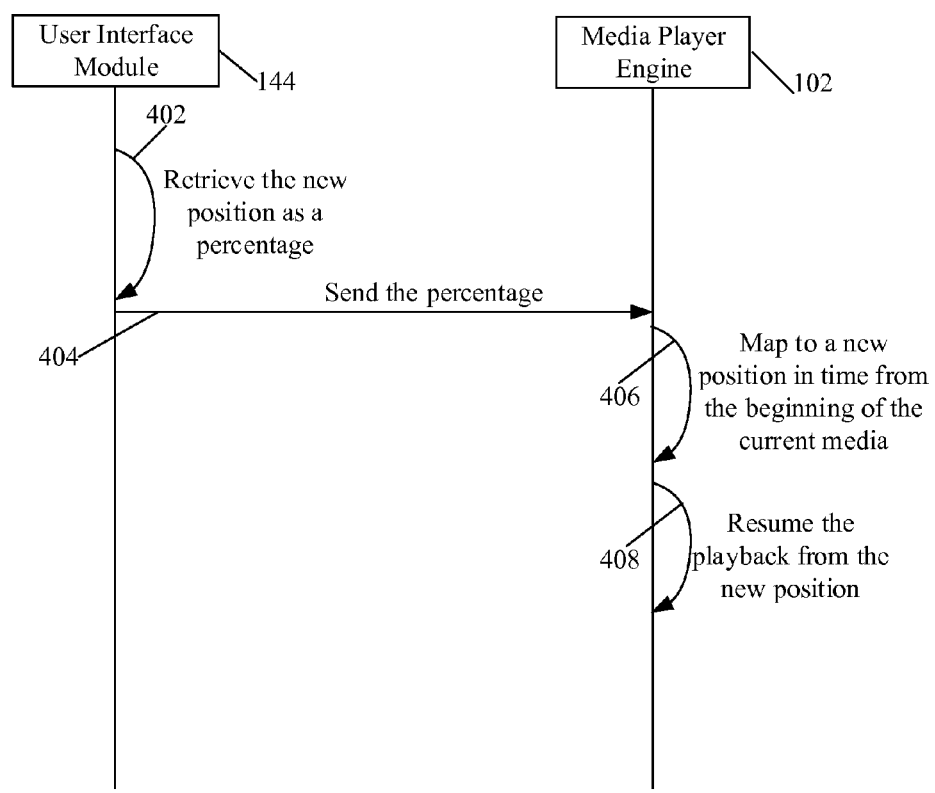
FIG. 4 is a sequence diagram depicting a process by which a media player adjusts the current playback position in accordance with the teachings of this disclosure.

Referring to FIG. 4, a sequence diagram depicting a process 400 by which the media player adjusts the current playback position is shown. At 402, the user interface module 144 retrieves the new position of the progress indicator 212 as a percentage of the progress control 202. For example, the underlying operating system or running environment (such as .NET or Java framework) provides the user interface module 144 with such percentage when the user releases the mouse, stylus or finger from the new position on the progress control 202. At 404, the user interface module 144 sends the percentage to the media player engine 102. At 406, the playback manager 140 receives the percentage, and maps the percentage to a new position in time from the beginning of the current media. At 408, the playback manager 140 resumes the playback of the current media from the new position. Accordingly, the new position becomes the current playback position.

Turning back to FIG. 2, jumping to a different playback position using the progress indicator 212 alone proves to lack accuracy. It is challenging to pin point a desired playback position using the progress indicator 212 alone. While the progress indicator 212 allows the user to set a new playback position in a desired area or neighborhood, the navigation regulators 204,206 provide finer playback navigation capability. The navigation regulator 204 is an active zone around the current playback position on the progress control 202. It should be noted that the active zone is a moving window as the playback of the current media proceeds. The active zone on the progress control 202 is indicated at 222, while the navigation regulator 204 provides an expanded or enlarged representation of the active zone 222.

For example, the size of the visual display of the navigation regulator 204 is about twenty times of the visual display of the active zone 222 on the progress control 202. The right end, middle and left end of the active zone 222 correspond to the right end (i.e., the −30 minute mark), middle (i.e., the zero minute mark) and left end (i.e., the +30 minute mark) of the navigation regulator 204. The zero minute mark 252 is also referred to herein as a reference point of the navigation regulator 204 and the active zone 222. The current playback position on the progress control 202 is referred to herein as a reference point of the progress control 202. The navigation regulator 204 illustrates a sixty minutes active zone that starts from the thirty minutes position prior to the current playback position, and ends at the thirty minutes position after the current playback position. In other words, the active zone 222 has an active zone size of sixty minutes.

The navigation regulator 204 includes an interactive navigation progress indicator 214 that is, by default, set at fifty percent (50%) of the navigation regulator 204. In should be noted that the indicator 214 is not always set at fifty percent mark of the navigation regulator 204 as illustrated later. However, the indicator 214 is set at the reference point 252. In one implementation, the indicator 214 is marked on substantially the full length of the left half portion of the navigation regulator 204 starting from the reference point 252. Alternatively, the navigation progress indicator 214 (such as a sliding control in the form of a button or bar) occupies a small portion of the navigation regulator 204 around the reference point 252. The active zone 222 defines the maximum range in which the user can adjust the current playback position using the navigation progress indicator 214. The navigation progress indicator 214 is thus only operative within the active zone 222.

The navigation progress indicator 214 is an interactive control, which a user can drag the right end (such as a sliding control) of the indicator 214 to the right or left of the reference point 252. For example, when the indicator 214 is dragged to and released from the left end of the navigator bar 204, the playback of current media will resume from a position that is thirty minutes before the current playback position. In such a case, the current playback position is navigated or moved backward by thirty minutes. As an additional example, when the indicator 214 is dragged to and released from the right end of the navigator bar 204, the playback of the current media will resume from a position that is thirty minutes after the current playback position. In other words, the current playback position is navigated or moved forward by thirty minutes. It should be noted that, when the indicator 214 is dragged to and released from a point that is between the reference point 252 and the right or left end of the bar 204, the current playback position is adjusted for a portion of thirty minutes. The adjustment is proportional to the distance between the reference point 252 and the releasing point. The two ends of the navigation regulator 204 and the active zone 222 form a trapezoid area 242. In one implementation, the area 242 is displayed in gray or some other colors, and/or patterns.

The navigation regulator 206 provides finer playback navigation. For an active zone 224 on the navigation regulator 204, the navigator bar 206 provides an expanded representation of the active zone 224. For example, the active zone 224 is six minutes in size that centers on the current playback position. The visually enlarged navigation regulator 206 represents the same six minutes active zone. Accordingly, it can be said that the navigation regulator 206 has a higher granularity than the navigation regulator 204. Similarly, the navigation regulator 204 has a higher granularity than the progress control 202.

The navigation regulator 206 also provides an interactive navigation progress indicator 216. The right end (such as a sliding control in the form of a button or bar) of the navigation progress indicator 216 can be dragged to the left or right of the 0 second mark 254 of the active zone. The 0 second mark 254 is referred to herein as a reference point of the active zone 224 and the navigation regulator 206. The active zone 224 defines the maximum range in which the user adjusts the current playback position using the navigation progress indicator 216. The navigation progress indicator 216 is thus only operative within the active zone 224. The two ends (right and left) of the navigation regulator 206 and the active zone 224 form a trapezoid area 244. In one implementation, the area 244 is displayed in gray or some other colors, and/or patterns.

Figure 5:
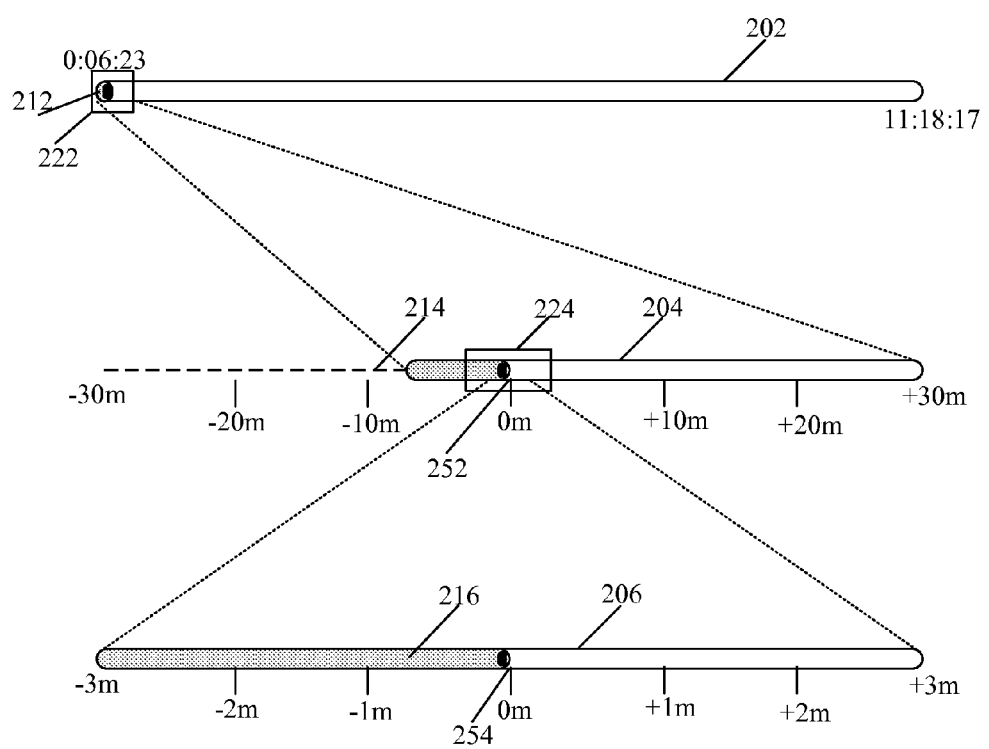
FIG. 5 is a block diagram depicting a media playback navigation system in accordance with the teachings of this disclosure.

When the current playback position is close to the beginning or end of the current media, the active zones may be smaller in size. The smaller active zones are further illustrated by reference to FIGS. 5 and 6. Turning first to FIG. 5, the current playback position of the current media is at the 0:6:23 (meaning six minutes and twenty three seconds) mark from the beginning of the current media. In such a case, the active zone 222 includes six minutes and twenty three seconds of the current media before the current playback position and thirty minutes after the current playback position. Accordingly, the user can drag the indicator 214 backward no more than six minutes and twenty three seconds. The active zone size of the active zone 222 is thus thirty six minutes and twenty three seconds (0:36:23). Because six minutes and twenty three seconds are longer than the half size of the active zone 224, the size of the active zone 224 is still six minutes. In such a case, the active zone 222 has an unbalanced size; and the active zone 224 has a balanced size. When the current playback position is within three minutes from the beginning of the current media, the active zone 224 will have an unbalanced size.

Figure 6:
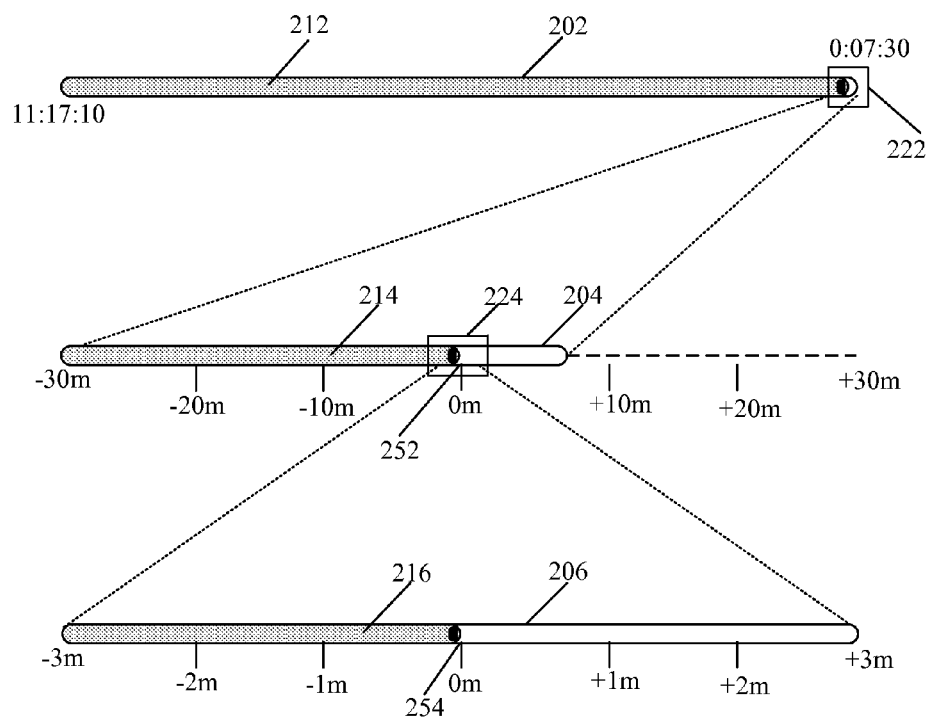
FIG. 6 is a block diagram depicting a media playback navigation system in accordance with the teachings of this disclosure.

Referring now to FIG. 6, the current playback position is 0:7:30 (meaning seven minutes and thirty seconds) from the end of the current media. Accordingly, the size of the active zone 222 is thirty seven minutes and thirty seconds. In other words, the active zone 222 starts from the position that is thirty minutes in the past from the current playback position, and ends at the end of the current media. In such a case, the active zone 222 has an unbalanced size.

Figure 7:
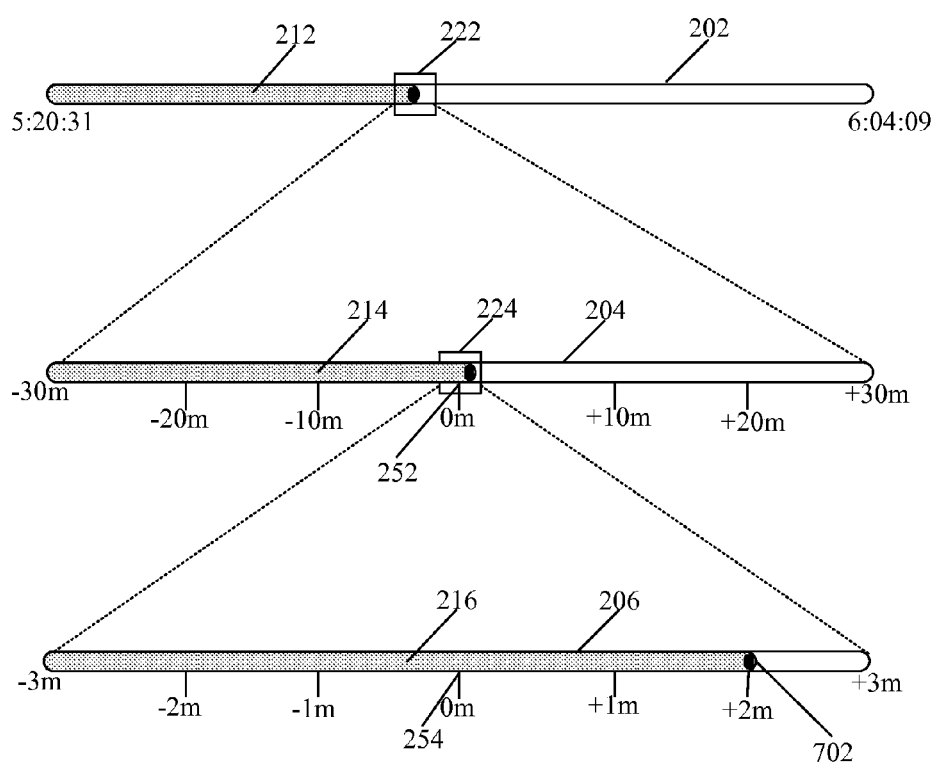
FIG. 7 is a block diagram depicting a media playback navigation system with a navigation regulator dragged away from a reference point in accordance with the teachings of this disclosure.

The playback navigation is further illustrated by reference to FIG. 7. Referring to FIG. 7, the user drags the navigation progress indicator 216 to the right (meaning fast forwarding) of the reference point 254 by about two minutes. When the dragging occurs, the navigation progress indicator 216 is updated to reflect the dragged to position 702 of the indicator 216. In a further implementation, the navigation progress indicator 214 is also updated to reflect the two minutes of fast forwarding. In other words, the navigation progress indicator 214 extends to the right for about two minutes. Similarly, the progress indicator 212 is optionally updated to reflect the two minutes of fast forwarding.

Figure 8:
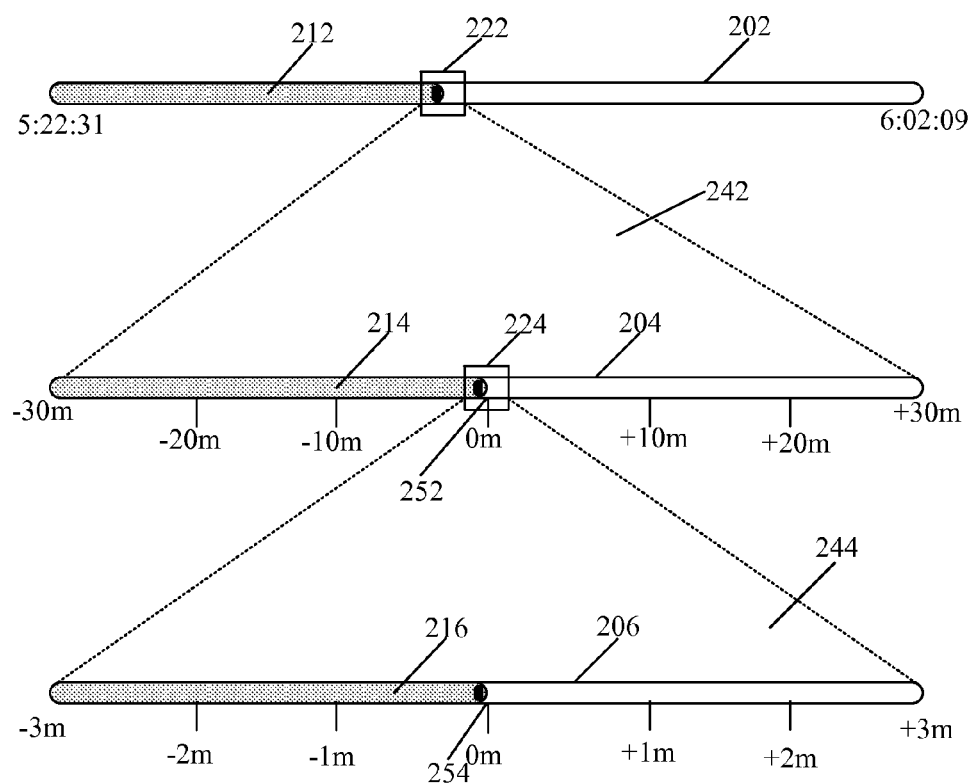
FIG. 8 is a block diagram depicting a media playback navigation system in accordance with the teachings of this disclosure.

When the user releases the navigation progress indicator 216, the current playback position is adjusted based on the position when the navigation progress indicator 216 is released. In the example above, the current playback position is moved forward by two minutes. Similarly, the current playback position can be moved backward. Furthermore, the user can operate the indicator 214 to adjust the current playback position as well. After the user releases the navigation progress indicator 216, both the navigation progress indicator 214 and the navigation progress indicator 216 are reset to their default positions, i.e., the reference points of their respective active zones 222,224. Accordingly, it can be said that the navigation progress indicator 214,216 reset to the corresponding reference points. The progress control 202 is then updated as well as shown in FIG. 8. It should be noted that, when the indicators 214 and 216 are not synchronized, releases the indicator 216 does not cause the indicator 214 reset. When the user is not operating the navigation progress indicator 214,216, they stay at their respective reference points while the media is played back. The navigation process is further illustrated by reference to FIGS. 9 and 10.

Figure 9:
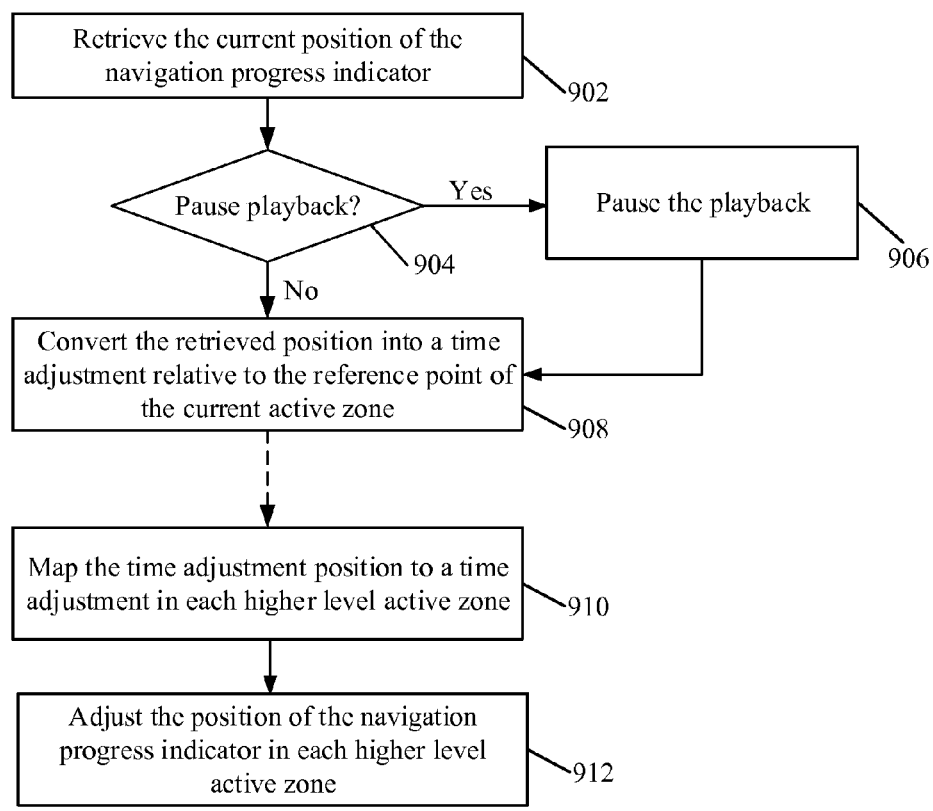
FIG. 9 is a flowchart depicting a process by which navigation of the playback of a media is illustrated in accordance with the teachings of this disclosure.

Referring first to FIG. 9, a process 900 for navigating the playback of a media is shown. The process 900 is performed by the user interface module 144 when a user drags a navigation progress indicator 214 or 216. At 902, the user interface module 144 receives the current position of the navigation progress indicator that the user is interacting with, such as the navigation progress indicator 216. The current position of the navigation progress indicator is a user input for adjusting the current playback position of the current media. In one implementation, the user interface module 144 registers itself with a user interface system to receive events and data related to the navigation regulators 202,204,206. Accordingly, when the user operates the navigation progress indicators (such as sliding controls) 212, 214,216, the user interface module 144 receives their current positions.

At 904, the user interface module 144 determines whether to pause the playback of the current media when the user is interacting with the navigation progress indicators 212,214, 216. In one implementation, whether to pause the playback in such a case is a configuration setting. If the playback needs to be paused, at 906, the user interface module 144 pauses the playback of the current media by, for example, sending a request to or calling an interface of the playback manager 140.

At 908, the user interface module 144 converts the retrieved position to a time adjustment relative to the reference point of the current active zone. For example, when the user drags the navigation progress indicator 216 toward left to the two minutes mark, the retrieved position is −0.66666667 as a percentage of the navigation progress indicator 216 on the navigation regulator 206. Accordingly, the time adjustment is negative two minutes. Optionally, at 910, the user interface module 144 maps the time adjustment of negative two minutes to a time adjustment in each higher level active zone. In the example above, the time adjustment in the active zone 224 on the navigation regulator 204 is −2 minutes (negative two minutes). At 912, the user interface module 144 adjusts the position of the navigation progress indicator in each higher level active zone. In the example above, the navigation progress indicator 214 retracts toward left of the reference point 252 for two minutes. Optionally, the navigation progress indicator 212 is also adjusted in the similar manner. It should be noted that the process 900 may be performed more than once while the user is operating a navigation progress indicator. In a further implementation, an additional navigation progress indicator is temporarily displayed and used when the process 900 is performed. Alternatively, temporary indicators are displayed in connection with the indicators 212, 214 or 216 when the process 900 is performed.

Figure 10:
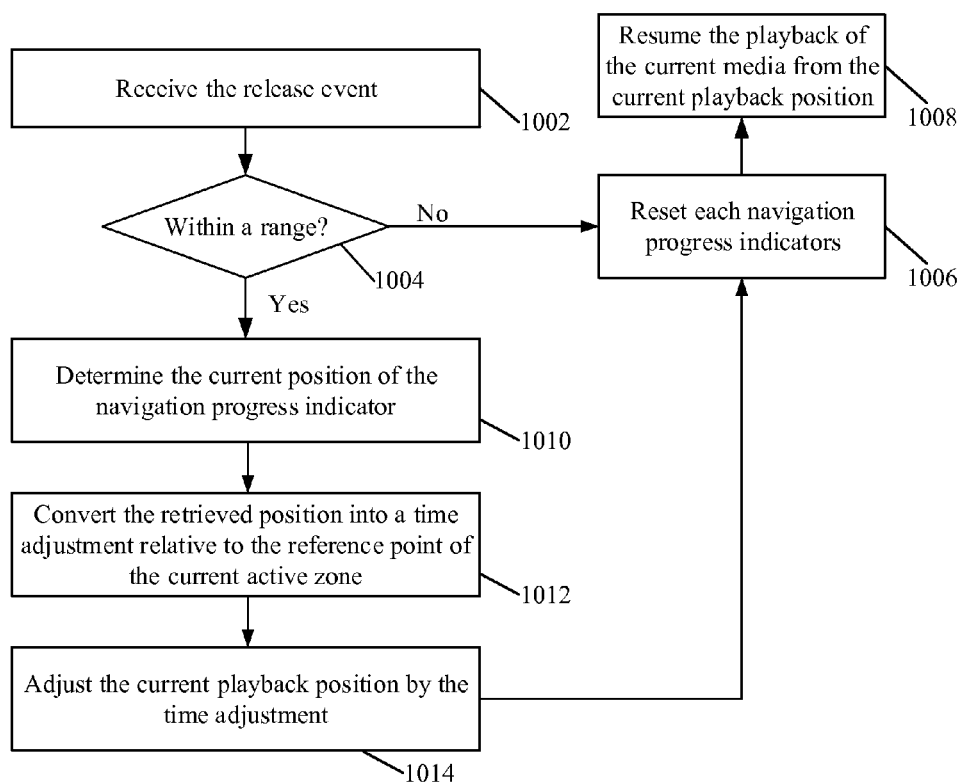
FIG. 10 is a flowchart depicting a process by which the current playback position of a media is adjusted in accordance with the teachings of this disclosure.

Turning now to FIG. 10, a process 1000 by which the user interface module 144 adjusts the current playback position when the user releases a navigation progress indicator by, for example, releasing a mouse button, a stylus, or his finger. At 1002, the user interface module 144 receives the event or notification. In one implementation, the event also indicates the screen coordinates of the pointing device (such as a mouse or stylus) or the user's finger when the release event occurs. At 1004, the user interface module 144 determines whether the coordinates are within a predetermined range around the navigation regulator. For example, the predetermined range around the navigation regulator 206 is a rectangle. The top side of the rectangle is ten pixels above the navigation regulator 206; the bottom side of the rectangle is ten pixels below the navigation regulator 206; the left side of the rectangle is ten pixels to the left of the navigation regulator 206; and the right side of the rectangle is ten pixels to the right of the navigation regulator 206. In a particular implementation, the predetermined range is the full range of the display screen 104. In such a case, the coordinates are within the predetermined range around the navigation regulator 204 or 206.

If the coordinates are outside of the range, at 1006, the user interface module 144 resets each navigation progress indictor to its default position (i.e., the reference point of the corresponding navigation regulator). If the playback is currently paused due to the interaction with the navigation indicators 214,216, at 1008, the user interface module 144 resumes the playback by calling or sending a command to the playback manager 140. Turning back to 1004, if the coordinates are within the range, at 1010, the user interface module 144 determines the current position of the navigation progress indicator (such as the indicator 206). For example, the user interface module 144 converts the coordinates into a percentage of the navigation progress indicator relative to the corresponding navigation regulator. As an additional example, the user interface module 144 retrieves the percentage from the underlying user interface system.

At 1012, the user interface module 144 converts the determined position to a time adjustment relative to the reference point of the current active zone. For example, when the user drags the navigation progress indicator 216 toward left to the two minutes mark, the position is −0.16666667 as a percentage of the navigation progress indicator 216 on the navigation regulator 206. Accordingly, the time adjustment is negative two minutes. At 1014, the user interface module 144 displays the current playback position based on the time adjustment relative to the current playback position (meaning the playback position when the user starts to operate or releases the navigation progress indicator). For example, where the time adjustment is −2 minutes relative to the current playback position, the user interface module 144 communicates the time adjustment to the playback manager 140. In response, the playback manager 140 rewinds the playback for two minutes. In other words, the playback manager 140 moves the current playback position backward by two minutes.

In one implementation, when the playback manager 140 moves the current playback position, an event is sent to the user interface module 144, which responsively adjusts the progress indicator 212 toward left for a number of pixels that correspond to two minutes in time on the progress control 202. Moreover, at 1006, the user interface module 144 resets each navigation progress indictors to their respective default positions (i.e., the respective reference points).

Oftentimes, media content (such as a sound track or a movie) includes numerous time marks. For example, the time marks are used to indicate beginning and/or end of recording elements, such as chapters, episodes, etc. As an additional example, time marks are inserted to indicate time intervals, such as every ten minutes or thirty minutes. As still a further example, the time marks are created for navigation history, the furthest point reached time mark, user defined bookmarks, the previous current playback position after the user adjusts the current playback position using the navigation progress indicators, etc. Each time mark is associated with a playback position within the current media. In one implementation, the time marks are saved into the database 142. For example, the playback manager 140 accesses the database 142 to store these time mark. The user interface 146 implements necessary elements to assist users to define time marks, such as bookmarks. For example, the user interface 146 provides a button, clicking of which defines a bookmark pointing the current playback position. As an additional example, the user interface 146 provides an edit box to allow users to specify a time as a bookmark of the media.

Figure 11:
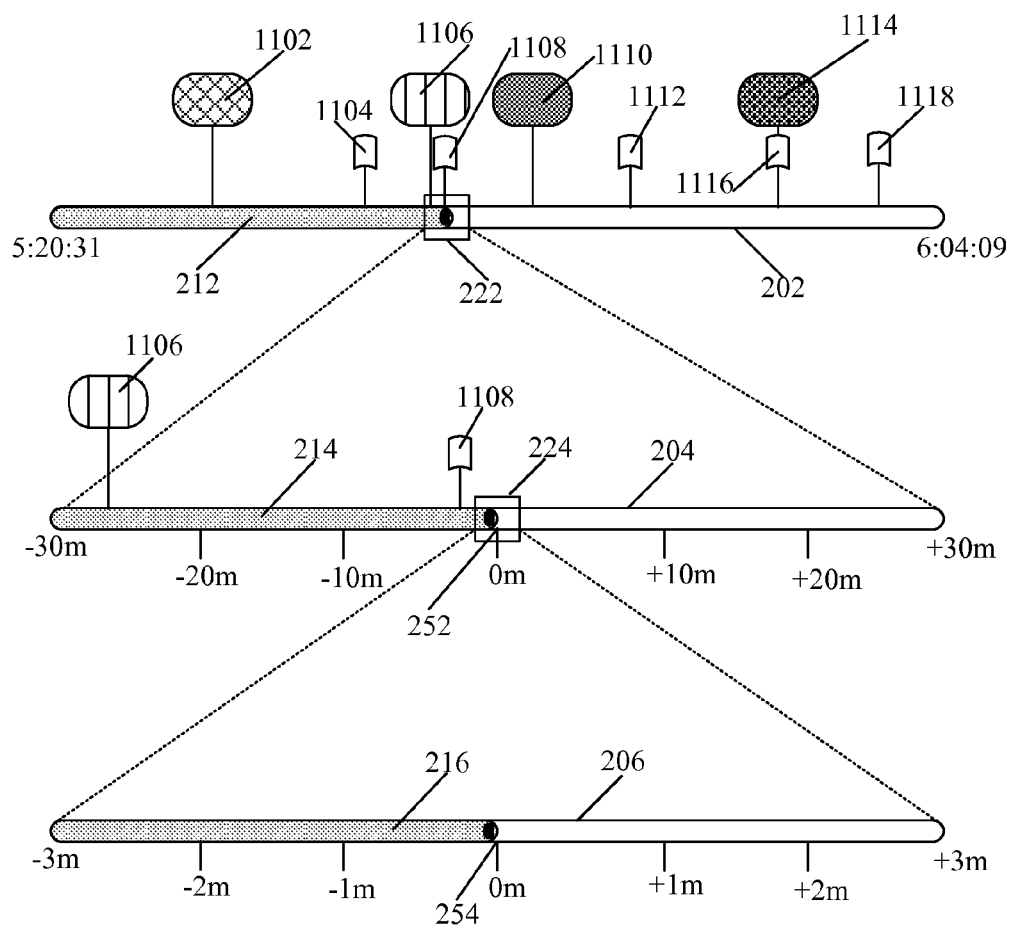
FIG. 11 is a block diagram depicting a media playback navigation system showing a set of visual time marks within a media in accordance with the teachings of this disclosure.

When the media is selected for playback, the playback manager 140 retrieves time marks associated with the media from the database 142. In addition, the user interface 146 displays some or all of the time marks on the display screen 104. Time marks are further illustrated by reference to FIG. 11. Visual indicators of a set of time marks are shown at 1102, 1104, 1106, 1108, 1110, 1112, 1114, 1116, and 1118. Each of the visual time marks 1102, 1104, 1106, 1108, 1110, 1112, 1114, 1116, and 1118 is associated with a point on a time bar, such as the progress bar 202 or the navigation regulators 204,206. In other words, each visual time mark is associated with a navigation control. In one implementation, each of the visual time marks is connected to a progress control or a navigation regulator. Alternatively, the visual time marks are not displayed as connected to the progress control or navigation regulators.

Visual time marks are objects visually associated with points on a navigation control and correspond to playback positions of the media. The visual time marks are associated with the navigation control by connecting with the navigation control, such as that between the visual time mark 1102 and the progress control 202. Alternatively, the visual time marks are associated with the navigation control without connecting with the navigation control. For example, a visual mark can be displayed above the progress control 202. As the media is being played back, visual time marks (such as the visual time marks 1106 and 1108) associated with a navigation regulator move from right to left. However, visual time marks that are visually associated with a playback progress control do not move as the media is being played back.

Some visual time marks are informational and not interactive, such as the visual time marks 1104, 1108, 1112, 1116, and 1118. Some other visual time marks are interactive, such as the visual time marks 1102, 1106, 1110, and 1114. In one embodiment, different types of interactive visual time marks are indicated using different types of shapes, colors, and/or patterns. For example, the visual time mark 1102 is a bookmark; the visual time mark 1106 is the previous current playback position (meaning the last point of interaction) after the user adjusts the playback position using the navigation progress indicator 214; the visual time mark 1110 indicates a predefined time mark, such as end or beginning of a chapter or episode; and the visual time mark 1114 is the furthest position that user once played up to.

Different from informational visual time marks s, interactive visual time marks s allow a user to navigate and control the playback of the current media. When the playback proceeds, the progress indicator 212 moves forward. When a visual time mark is within the active zone 222, it (such as the visual time marks 1106, 1108) is also shown on the navigation regulator 204. Similarly, when a visual time mark is within the active zone 224, it is also shown on the navigation regulator 206. More generally stated, when a visual time mark is associated to a navigation control of a lower granularity and the corresponding time mark is within the active zone of a navigation regulator of a higher granularity, the visual time mark is displayed with the navigation regulator with the higher granularity. This feature makes visual time marks, especially interactive time marks, extremely useful to control playback of a media. One reason is that visual time marks shown on a progress bar often appear too close to each other. Accordingly, it is hard to operate the crowded visual time marks on the progress bar.

Figure 12:
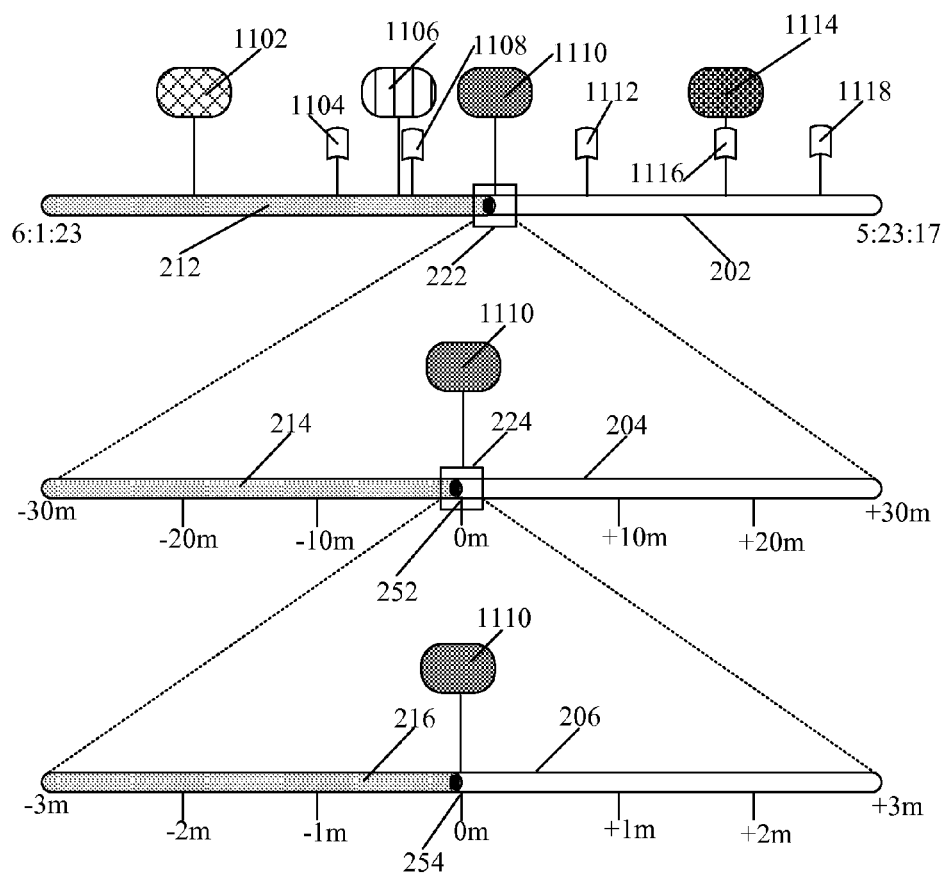
FIG. 12 is a block diagram depicting a media playback navigation system showing a set of visual time marks within a media in accordance with the teachings of this disclosure.

When the user clicks or touches (through a touchscreen), for example, the interactive visual time mark 1110, the current playback position is moved to the position of the visual time mark 1110 as shown in FIG. 12. In such a case, it can be said that the progress control 202 is adapted to move to the current playback position to a position corresponding to the visual time mark 1110; and the visual time mark 1110 is said to have been operated on. When a visual time mark, such as the visual time mark 1106, is shown at multiple places, clicking each of the displayed visual time mark 1106 produces the same result. When the user operates the visual time mark 1106 displayed on the navigation regulator 204, the navigation regulator 204 is said to be adapted to move to the current playback position to a position corresponding to the visual time mark 1106.

Figure 13:
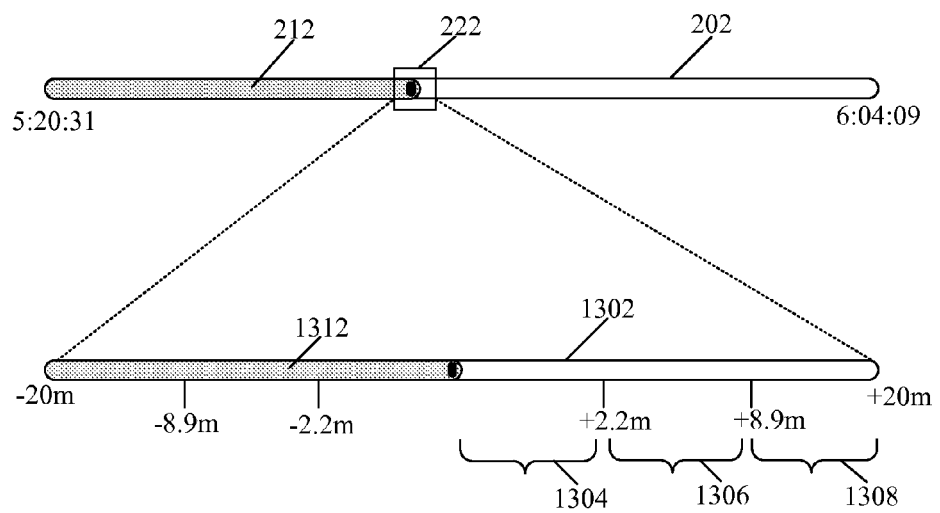
FIG. 13 is a block diagram depicting a media playback navigation system with a nonlinear navigation regulator in accordance with the teachings of this disclosure.

The navigation regulators 204,206 are linear navigation regulators. In other words, any line segment of a fixed number of pixels along the navigation regulator 204 (or 206) corresponds to a same amount of playback time of the current media. In alternate embodiments of the present teachings, the navigation regulator 204 or 206 is not linear. A nonlinear navigation regulator is shown at 1302 in FIG. 13. Three pixel line segments 1304,1306,1308 have approximately the same length. However, they correspond to different playback times 2.2 minutes, 6.7 minutes (i.e., 8.9-2.2), and 11.1 minutes (i.e., 20-8.9) respectively. In other words, when the navigation progress indicator 1312 extends to the left for the length of the segment 1304, the playback position is moved forward by 2.2 minutes. However, when the navigation progress indicator 1312 extends to the left for the length of the segment 1306, the playback position is moved forward by 6.7 minutes.

Figure 14:
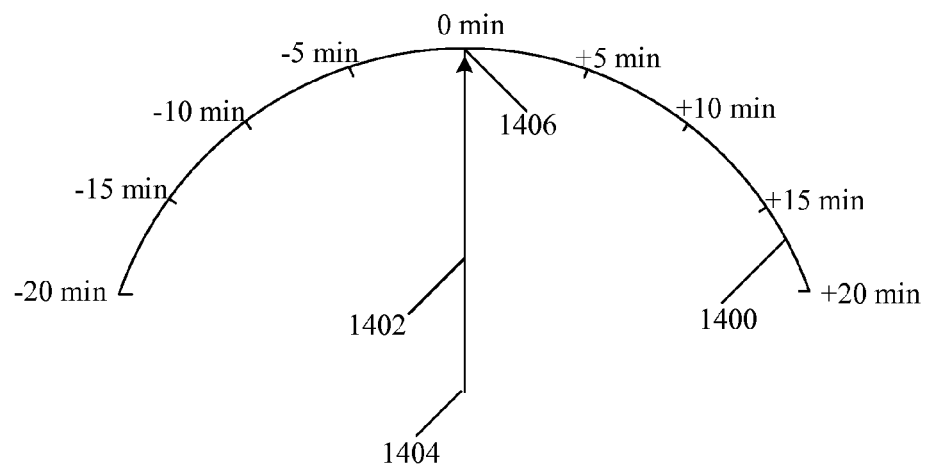
FIG. 14 is a diagram depicting a navigation regulator within a media playback navigation system in accordance with the teachings of this disclosure.

Furthermore, the navigation regulators 204,206 can be in different shapes and styles. In an implementation as shown in FIG. 14, a navigation regulator 1400 is a partial arc. A navigation progress indicator 1402 provides the same functions as the navigation progress indicators 214,216. To fast forward the playback, a user drags the arrow end of the indicator 1402 toward lower right corner of the navigation regulator 1400. The indictor 1402 pivots around the center point 1404. The 0 minute mark 1406 at the middle of the navigation regulator 1400 is referred to herein as a reference point of the indicator 1402 and the navigation regulator 1400. Similarly, to move backward of the playback, a user drags the arrow end of the indicator 1402 toward lower left corner of the navigation regulator 1400.

Obviously, many additional modifications and variations of the present disclosure are possible in light of the above teachings. Thus, it is to be understood that, within the scope of the appended claims, the disclosure may be practiced otherwise than is specifically described above. For example, the media playback navigation system 200 includes only one navigation regulator (i.e., the navigation regulator 204), or more than two navigation regulators. As an additional example, the navigation regulator 206 is not present in the media playback navigation system 200; and the granularity of the navigation regulator 204 is in seconds or even milliseconds. As still a further example, the navigation regulators 202,204,206 further display the moving playback position as a time relative to their reference points as the user drags the corresponding navigation progress indictors 212, 214,216.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A media playback system comprising:
   i. a media player operating on a media playback device and playing back a media, said media playback device having a processor, a memory and a display screen; and
   ii. a set of navigation controls with increasing granularities wherein the set of navigation controls includes a set of navigation regulators, wherein each navigation regulator in the set of navigation regulators is displayed on said screen when the media player is displayed and includes a navigation progress indicator that is adapted to adjust the current playback position of the media wherein each navigation progress indicator operates within a corresponding active zone and resets to a corresponding default point after the current playback position is adjusted, wherein the default point is a center point of the active zone when the active zone has a balanced size.

2. The media playback system of claim 1, wherein the set of navigation controls further includes a progress control wherein the progress control includes a navigation progress indicator that is adapted to indicate a playback progress of the media and adjust a current playback position of the media.

3. The media playback system of claim 1, wherein the default point is different from the center point of the navigation regulator when the active zone has an unbalanced size.

4. The media playback system of claim 1, wherein at least one navigation regulator in the set of navigation regulators is nonlinear.

5. The media playback system of claim 1, wherein the set of navigation regulators consists of one or two navigation regulators.

6. A method for accurately navigating the playback of a media, the method operating within a media playback device and comprising:
   i. reading a media from a media source;
   ii. playing back the media using one or more media output devices;
   iii. receiving a user input to adjust a current playback position of the media, wherein the user input is generated using a navigation progress indicator of a first navigation regulator, wherein the navigation progress indicator is operative within an active zone of the first navigation regulator and wherein the first navigation regulator is displayed on a screen of the media playback device when the media is being played back;
   iv. converting the user input into a time adjustment;
   v. adjusting the current playback position of the media based on the time adjustment, thereby forming a new current playback position; and
   vi. resetting the navigation progress indicator to a default point of the active zone of the first navigation regulator, wherein the default point is a center point of the active zone when the active zone has a balanced size.

7. The method of claim 6 further comprising:
   i. in response to reception of the user input, pausing the playback of the media; and
   ii. after adjusting the current playback position of the media, resuming the playback of the media from the new current playback position.

8. The method of claim 6, wherein the first navigation regulator is nonlinear.

9. The method of claim 6 further comprising moving a navigation progress indicator on a second navigation control to reflect the time adjustment.

10. The method of claim 9, wherein the granularity of the second navigation regulator is different from the granularity of the first navigation regulator.

11. The method of claim 6, wherein the default point is different from the center point of the active zone when the active zone has an unbalanced size.

12. A media playback system comprising:
    i. a media playback device having a processor, a memory and a display screen;
    ii. a media player operating on said media playback device and playing back a media;
    iii. a set of navigation controls with increasing granularities wherein each navigation control in said set of navigation controls has an active zone, and wherein said set of navigation controls is displayed by said media player on said screen of said media playback device when the media player is displayed and includes a set of navigation regulators, wherein each navigation regulator in said set of navigation regulators includes a navigation progress indicator that is adapted to adjust a current playback position of said media wherein each navigation progress indicator operates within the corresponding active zone and resets to a corresponding default point after said current playback position is adjusted, wherein:
       a) said default point is a center point of said active zone when said active zone has a balanced size; and
       b) said default point is different from said center point of said active zone when said active zone has an unbalanced size; and
    iv. a set of visual time marks associated with said set of navigation controls, wherein said set of visual time marks corresponds to a set of time marks within said media and is displayed by said media player on said screen.

13. The media playback system of claim 12, wherein a second visual time mark is associated with a second navigation control when a first visual time mark is associated with a first navigation control, said second navigation control has a higher granularity than said first navigation control, and the time mark corresponding to said first visual time mark is within the active zone of said second navigation control, wherein said first and second navigation controls are within said set of navigation control and said first and second visual time marks are within said set of visual time marks.

14. The media playback system of claim 12, wherein a visual time mark is associated with a navigation control within said set of navigation controls when the time mark corresponding to said visual time mark is within the active zone of said navigation control.

15. A media playback system comprising:
   i. a media playback device having a processor, a memory and a display screen;
   ii. a media player operating on said media playback device and playing back a media;
   iii. a set of navigation controls with increasing granularities wherein said set of navigation controls is displayed by said media player on said screen of said media playback device when the media player is displayed, wherein the set of navigation controls includes more than one navigation control, wherein said set of navigation controls includes a set of navigation regulators, wherein each navigation regulator in said set of navigation regulators includes a navigation progress indicator that is adapted to adjust a current playback position of said media wherein each navigation progress indicator operates within a corresponding active zone and resets to a corresponding default point after said current playback position is adjusted, wherein said default point is a center point of said active zone when said active zone has a balanced size or is different from said center point when said active zone has an unbalanced size; and
   iv. a set of interactive visual time marks associated with said set of navigation controls, wherein said set of interactive visual time marks corresponds to a set of time marks within said media and is displayed by said media player on said screen, and wherein each interactive visual time mark in said set of interactive visual time marks is adapted to adjust a current playback position of said media to a corresponding time mark.

16. The media playback system of claim 15, wherein said media player is adapted to
   i. receive a user input to adjust said current playback position, wherein said user input is generated when an interactive visual time mark within said set of interactive visual time marks is operated on;
   ii. adjust said current playback position to the time mark corresponding to said interactive visual time mark, thereby forming an updated current playback position;
   iii. adjust each navigation control within said set of navigation controls to reflect said updated current playback position; and
   iv. resume the playback of said media from said updated current playback position.

17. The media playback system of claim 15, wherein said set of interactive visual time marks includes at least one of a predefined time mark, a user defined time mark, a furthest point reached time mark, or a last point of interaction time mark.

18. The media playback system of claim 15, wherein a second interactive visual time mark is associated with a second navigation control when a first interactive visual time mark is associated with a first navigation control, said second navigation control has a higher granularity than said first navigation control, and the time mark corresponding to said first interactive visual time mark is within an active zone of said second navigation control, wherein said first and second navigation controls are within said set of navigation control and said first and second interactive visual time marks are within said set of interactive visual time marks.

19. The media playback system of claim 15, wherein an interactive visual time mark is associated with a navigation control within said set of navigation controls when the time mark corresponding to said interactive visual time mark is within an active zone of said navigation control.

* * * * *